Jan. 12, 1926.　　　　　　　　　　　　　　　　1,569,405
J. L. SOMMER
LIFTER FOR FRUIT JARS AND THE LIKE
Filed Oct. 17, 1922
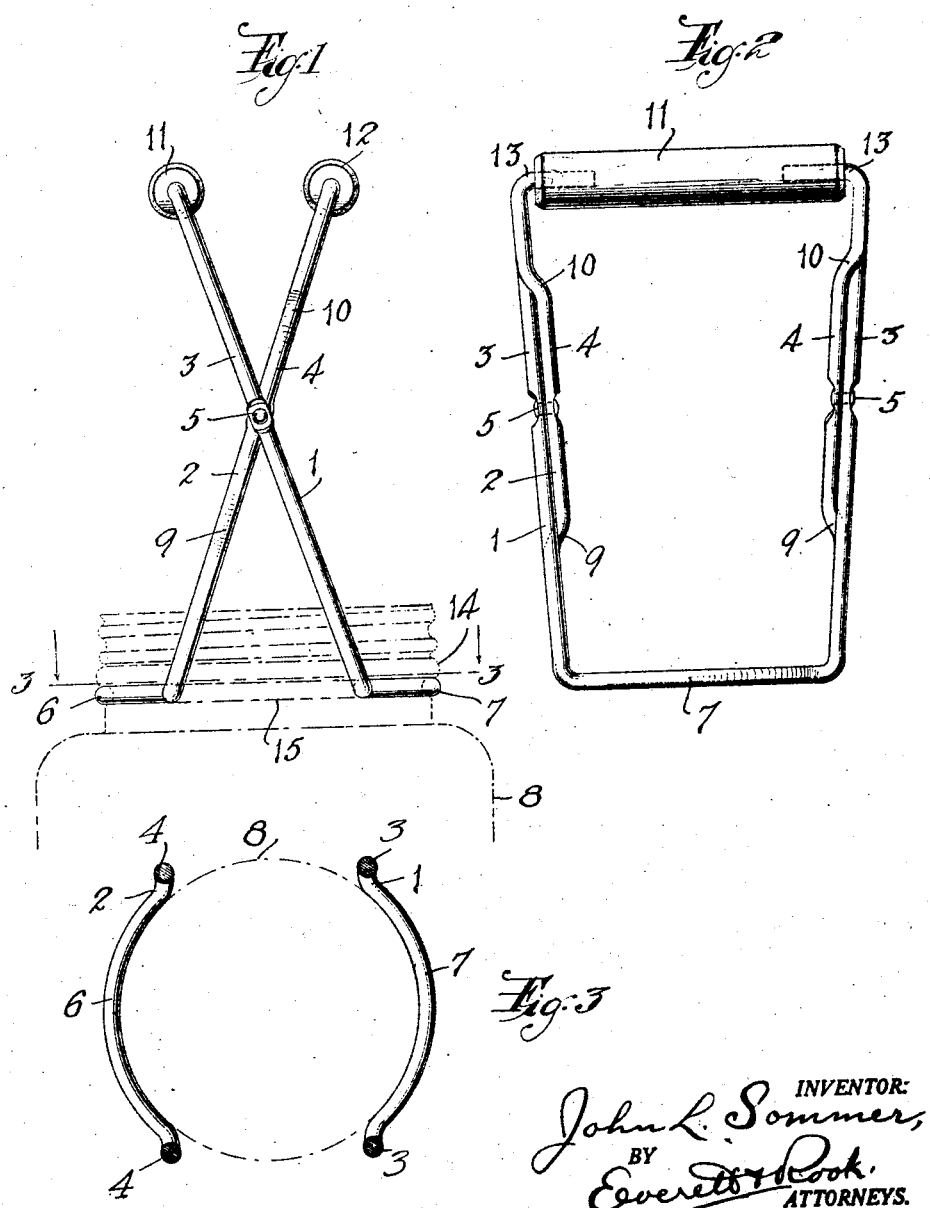

Patented Jan. 12, 1926.

1,569,405

UNITED STATES PATENT OFFICE.

JOHN L. SOMMER, OF NEWARK, NEW JERSEY, ASSIGNOR TO J. L. SOMMER MANUFACTURING CO., A CORPORATION OF NEW JERSEY.

LIFTER FOR FRUIT JARS AND THE LIKE.

Application filed October 17, 1922. Serial No. 595,105.

*To all whom it may concern:*

Be it known that I, JOHN L. SOMMER, a citizen of the United States, and a resident of Newark, in the county of Essex and State of New Jersey, have invented new and useful Improvements in Lifters for Fruit Jars and the like, of which the following is a specification.

This invention relates more especially to a kitchen utensil for use in connection with fruit jars in canning or preserving, although it might be applied to any other use for which it may be found suitable.

The objects of the invention are to secure a simple and strong construction by which an open fruit jar may be grasped by its extreme top without danger of slippage or dropping; to provide a firm hand hold, easy of access and in which there shall be no danger of burning the hand; to grasp the jar in stable position; to enable the lifter to be folded when not in use, and to obtain other advantages and results as may be brought out by the following description.

Referring to the accompanying drawings, in which like numerals of reference indicate the same parts throughout the several views, Figure 1 is a side view of my improved lifter in engagement with a fruit jar, looking endwise of the handles;

Figure 2 is a similar view of the lifter looking at the side of a handle, and

Figure 3 is a section on line 3—3, Fig. 1.

In the specific embodiment of the invention shown in the drawings, 1 and 2 indicate the two members of the lifter, each formed of wire bent into approximately U-shape with the side arms 4, 4 of one member lying between the side arms 3, 3 of the other member and pivoted thereto intermediate their ends, as at 5, 5.

The closed ends of the two members are preferably substantially at right angles to the side arms and form gripping jaws 6, 7, each of which is bowed outwardly from the other so as to fit against the neck of a fruit jar 8 shown in outline in Figures 1 and 3 and grasp the same firmly for lifting. In order to have these jaws alike, the side arms 4, 4 of the inner member 2 are bent outwardly between their points of pivoting and said jaw as at 9, 9 in the drawing. Similarly the upper ends of said arms 4, 4 are bent outwardly above the point of pivoting, as at 10, and the extremities of each pair of side arms of the members 1 and 2 are bent inward toward each other to enter suitable sockets therefor in the ends of handles 11, 12, the bent-in ends of the extremities of the member 2 being clearly shown in Figure 2 and marked 13, 13. Preferably the handles are cylindrical and of wood, and the two pivoted members are made of heavy wire, being flattened at their opposite outer sides where they are pivoted together.

By the construction thus described a lifter is provided which when not in use can be collapsed with its two handles 11, 12 brought together and also its jaws 6, 7 adjacent each other to occupy less space. When the user desires to grasp a fruit jar, the handles are separated to separate the jaws 6, 7 to receive the neck of the fruit jar and lie beneath a projection thereon such as the peripheral bead 14 shown in the drawing and preferably in a groove 15 therebeneath which is commonly found in fruit jars. Then by grasping both handles 11, 12 with one hand they are pressed together with sufficient force to hold the fruit jar and lift the same. At the same time the lifter or the members 1 and 2 thereof are long enough so that there is no danger of burning the hand, and the jar is held very securely and firmly in stable position. The device is particularly useful in putting filled fruit jars into sterilizers on the fire filled with hot water, and removing the jars therefrom after they have been thoroughly heated. Obviously, however, the invention can be applied to any other use for which it is adapted.

By reason of the inwardly offset middle portions of the side arms of the member 2, the said member can be pivoted between the arms of the other member 1, flatwise thereagainst, and yet the jaws of the two members be of the same length and configuration, as well as the handles 11, 12. This greatly facilitates use of the implement, as it feels the same in the hand no matter from what side it is picked up and the jaws 6, 7 engage and grip the jar exactly alike and with the same force.

Various detail modifications may be made in the manufacture of my improved lifter without departing from the spirit and scope of the invention; therefore, I do not wish to be understood as restricting myself except as required by the following claim when construed in the light of the prior art.

Having thus described the invention, what I claim is:

A lifter for jars, comprising rectangular members each having a handle at one end and an outwardly curved gripping jaw at the other end, one of said members having substantially parallel arms and the arms of the other member being offset toward each other for their middle portions intermediate the ends of the member and pivoted between the arms of the other member flatwise thereagainst, whereby the jaw and the handle of one member may be duplicates of those of the other member to secure uniformity in manufacture and use.

JOHN L. SOMMER.